United States Patent
Lin et al.

(10) Patent No.: US 8,373,798 B2
(45) Date of Patent: Feb. 12, 2013

(54) TEXT PROTECTION DEVICE AND RELATED MOTION ADAPTIVE DE-INTERLACING DEVICE

(75) Inventors: Yu-Mao Lin, Tainan (TW); Chih-Chia Kuo, Hsinchu County (TW)

(73) Assignee: NOVATEK Microelectronics Corp., Hsinchu Science Park, Hsin-Chu (TW)

( * ) Notice: Subject to any disclaimer, the term of this patent is extended or adjusted under 35 U.S.C. 154(b) by 628 days.

(21) Appl. No.: 12/563,168

(22) Filed: Sep. 21, 2009

(65) Prior Publication Data

US 2010/0277642 A1 Nov. 4, 2010

(30) Foreign Application Priority Data

Apr. 30, 2009 (TW) ................................. 98114335 A

(51) Int. Cl.
*H04N 7/01* (2006.01)
*H04N 11/20* (2006.01)
*G06K 9/34* (2006.01)
(52) U.S. Cl. .................... 348/448; 348/449; 382/176
(58) Field of Classification Search .................... None
See application file for complete search history.

(56) References Cited

U.S. PATENT DOCUMENTS

| 6,438,265 | B1 * | 8/2002 | Heilper et al. ............... 382/172 |
| 6,795,123 | B2 | 9/2004 | Gotanda |
| 8,023,041 | B2 | 9/2011 | Jia |
| 2002/0080269 | A1 * | 6/2002 | Gotanda et al. ............... 348/448 |
| 2007/0177060 | A1 * | 8/2007 | Tsuzuki ........................ 348/625 |
| 2007/0188607 | A1 * | 8/2007 | Jia et al. ......................... 348/97 |

FOREIGN PATENT DOCUMENTS

| CN | 1360437 A | 7/2002 |
| CN | 101014096 A | 8/2007 |

* cited by examiner

*Primary Examiner* — Jefferey Harold
*Assistant Examiner* — Michael Teitelbaum
(74) *Attorney, Agent, or Firm* — Winston Hsu; Scott Margo

(57) ABSTRACT

A text protection device for de-interlacing operation includes a pixel value difference calculation unit, a text detection unit and a vertical interpolation unit. The pixel value difference calculation unit is utilized for calculating pixel value differences of a plurality of pixels of a field according to a position of a target pixel being inserted into the field. The plurality of pixels forms a detection area corresponding to the target pixel. The text detection unit is utilized for determining whether the detection area includes a text stroke and determining whether the target pixel is located within a range of the text stroke to generate a text detection signal. The vertical interpolation unit performs a vertical interpolation operation to generate a pixel value of the target pixel according to the text detection signal.

17 Claims, 6 Drawing Sheets

TEXT PROTECTION DEVICE AND RELATED MOTION ADAPTIVE DE-INTERLACING DEVICE

BACKGROUND OF THE INVENTION

1. Field of the Invention

The present invention relates to a text protection device for de-interlacing operation, and more particularly to, a text protection device for a motion adaptive de-interlacing operation.

2. Description of the Prior Art

An image display technology can be classified into an interlaced scan and a progressive scan. When a frame is displayed, the conventional interlaced scan technology sequentially scans two fields composed of the odd scan lines of the frame and the even scan lines of the frame, respectively. The progressive scan technology (i.e. non-interlaced) sequentially scans all scan lines of the frame by multiple horizontal scan frequency to obtain a better performance on display.

Since each frame of the interlaced image is only half an original frame, if the interlaced image intends to be displayed by the progressive scan technology, an interlaced to progressive conversion (i.e. de-interlace) must be performed on the interlaced image in order to re-generate a scan line between two adjacent scan lines of the interlaced scan frame. In the prior art, motion adaptive de-interlacing (MAD) is an advanced de-interlacing technology, which can distinguish a dynamic image area or a static image area according to pixel value differences of the fields, and selects an inter-field interpolation method (e.g. WAEVE mode) to process the static image area, selects an intra-field interpolation method (e.g. BOB mode) to process the dynamic image area, or even selects blending of the two methods according to motion magnitudes of the image area.

The inter-field interpolation uses data of adjacent fields to generate a complete frame by interpolation. When the frame is completely static, through the inter-field interpolation, it is sufficient to generate an ideal re-establishing image. Besides, the vertical resolution can be as good as that in the original non-interlaced frame. However, when there is a moving object in the frame, the inter-field interpolation method may result in flicker on the displayed image since positions of the moving object in two adjacent fields are different.

The intra-field interpolation is adapted to re-establishment of the frame with moving objects. Since the intra-field interpolation uses single field data to re-establish the whole frame, which is irrelevant to object motion between adjacent fields, the image obtained by intra-field interpolation thus has a better motion effect. In addition, since the simple vertical interpolation easily results in saw-tooth shaped images, the prior art further detects edges of the image object through an edge detection mechanism and performs the intra-field interpolation operation along edge directions of the detected edges to avoid saw-toothed artifacts appearing on the object image.

However, when the video signals have a moving text image, such as running captions in a news channel or a scrolling cast list in a film, if the moving text image is processed by the intra-field interpolation method according to the prior art, since the direction with a smaller pixel value difference is considered as the edge of the image object by the edge detection mechanism, the text image is likely suffered from uncomfortable "tipped text" artifacts on the text stroke intersection or the horizontal text stroke of the text image due to false determinations of the edge direction, as shown in FIG. 1. Consequently, the user's demand for the high quality image can not be met.

SUMMARY OF THE INVENTION

It is therefore an objective of the present invention to provide a text protection device and related motion adaptive de-interlacing device.

The present invention discloses a text protection device for de-interlacing operation. The text protection device includes a pixel value difference calculation unit and a text detection unit. The pixel value difference calculation unit is utilized for calculating pixel value differences of a plurality of pixel pairs of a field according to a position where a target pixel to be inserted into the field. The plurality of pixel pairs forms a detection area corresponding to the target pixel. Each of the plurality of pixel pairs has two pixels corresponding to a first scan line and a second scan line. The first scan line and the second scan line are located above and below the position where the target pixel to be inserted, respectively. The text detection unit coupled to the pixel value difference calculation unit, for determining whether the target pixel is within a range of a text stroke according to a pixel value difference distribution of the detection area to generate a text detection signal.

The present invention further discloses a motion adaptive de-interlacing device with a text protection function. The motion adaptive de-interlacing device includes an input terminal, a two dimension de-interlacer, a three dimension de-interlacer, a text protection unit, a multiplexer, a motion detector and a blending circuit. The input terminal is utilized for receiving a field of an interlaced image data. The two dimension de-interlacer is coupled to the input terminal and utilized for outputting a two dimension de-interlacing result according to a position where a target pixel to be inserted into the field. The three dimension de-interlacer is coupled to the input terminal, and utilized for outputting a three dimension de-interlacing result corresponding to the target pixel. The text protection unit is coupled to the input terminal, and utilized for determining whether the position where the target pixel to be inserted is a text area, to output a vertical interpolation operation result corresponding to the target pixel and a text detection signal. The multiplexer is coupled to the two dimension de-interlacer and the text protection unit and utilized for selectively outputting the two dimension de-interlacing result and the vertical interpolation operation result according to the text detection signal. The motion detector is coupled to the input terminal, and utilized for generating a motion estimation value according to a motion magnitude of an image surrounding the position of the target pixel to be inserted. The blending circuit is coupled to the multiplexer, the two dimension de-interlacer, the three dimension de-interlacer and the motion detector, and utilized for blending an output of the multiplexer with the three dimension de-interlacing result according to the motion estimation value to generate an progressive image data.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
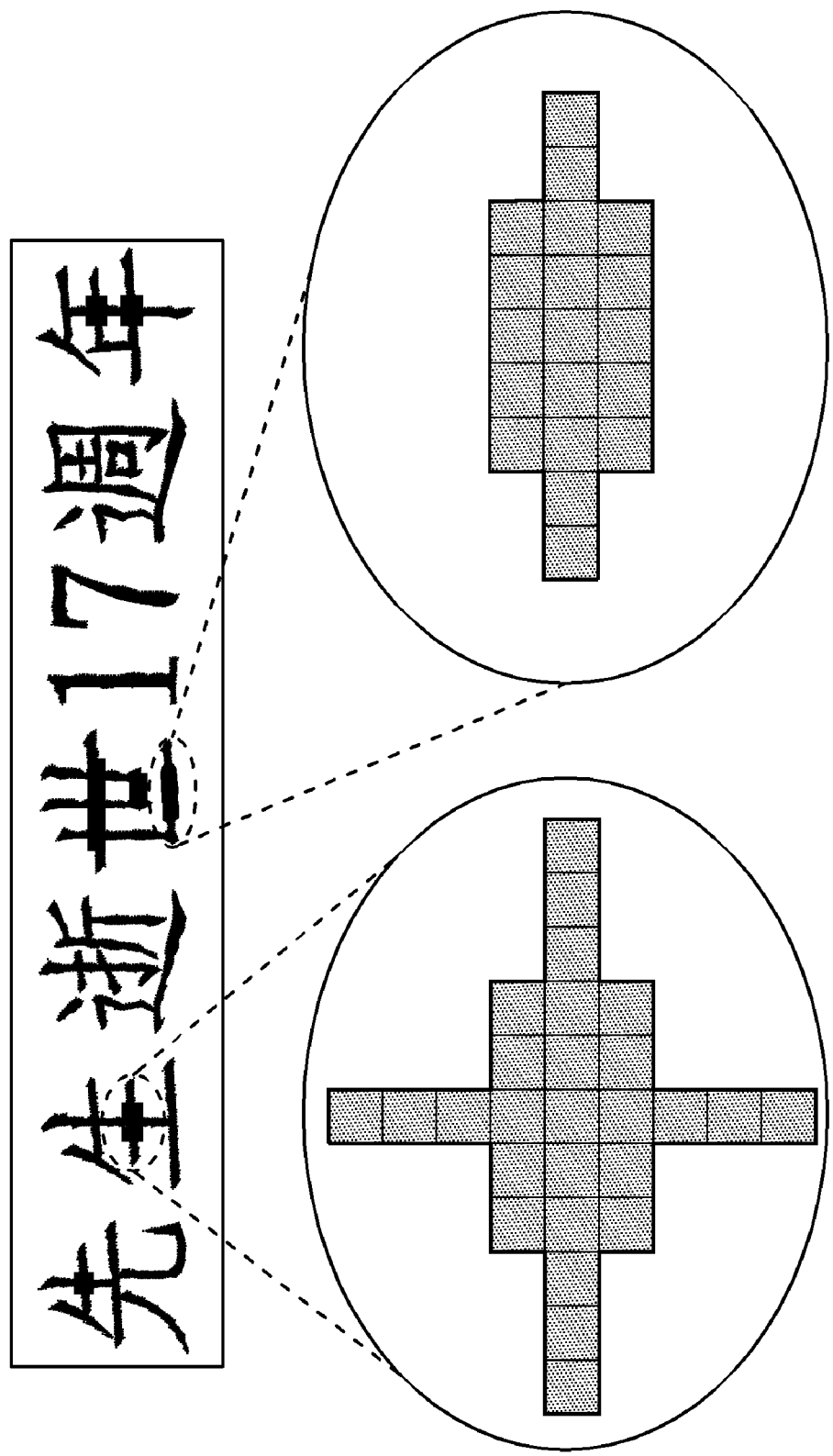
FIG. 1 illustrates a blur of a motion text image due to de-interlaced technology according to the prior art.
Figure 2:
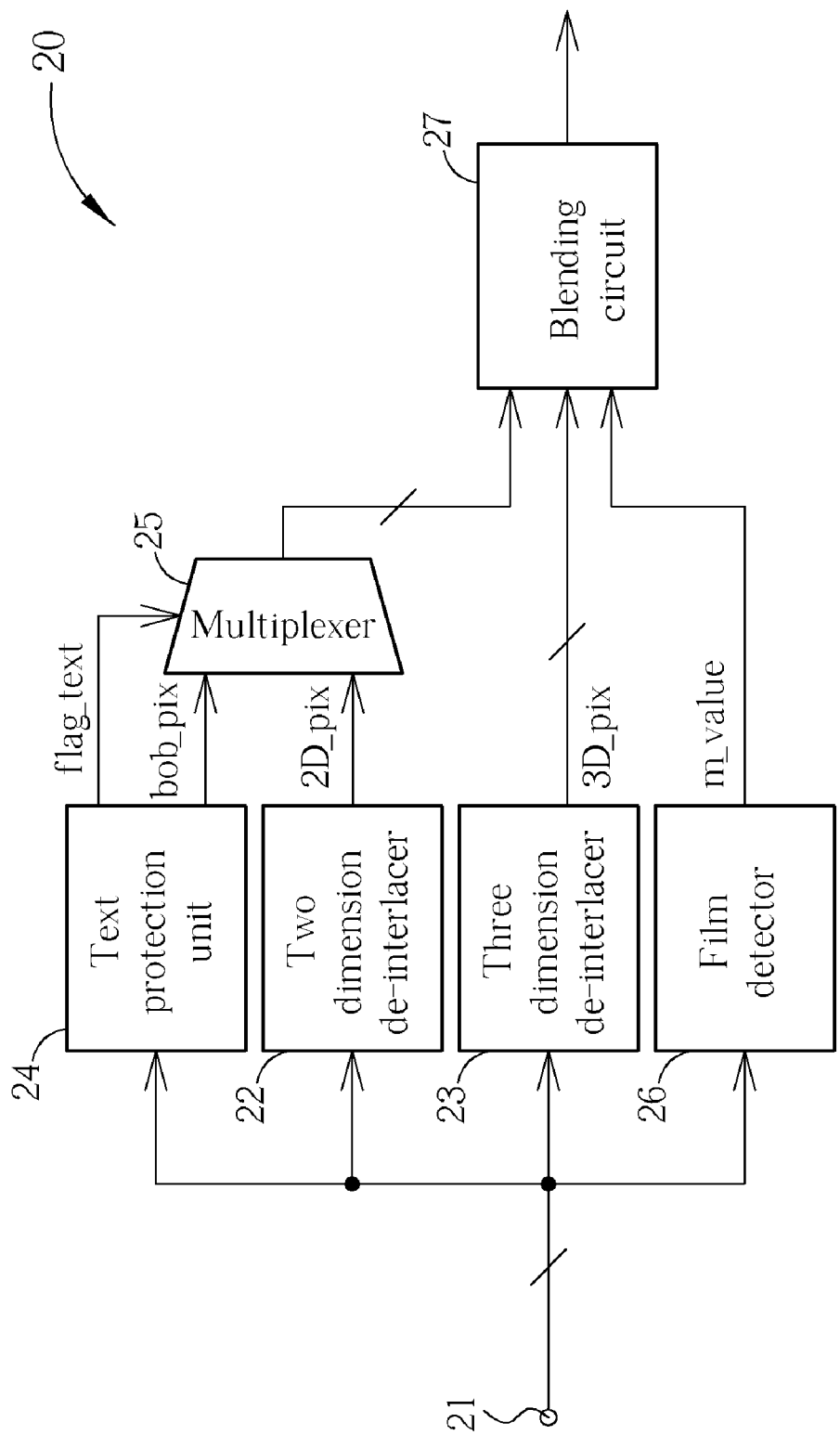
FIG. 2 is a schematic diagram of a motion adaptive de-interlacing device with a text protection according to an embodiment of the present invention.

Please refer FIG. 2, which is a schematic diagram of a motion adaptive de-interlacing device 20 with a text protection function according to an embodiment of the present invention. The motion adaptive de-interlacing device 20 includes an input terminal 21, a two dimension de-interlacer 22, a three dimension de-interlacer 23, a text protection unit 24, a multiplexer 25, a motion detector 26 and a blending circuit 27. The input terminal 21 is utilized for receiving a field of an interlaced image data. The two dimension de-interlacer 22 is coupled to the input terminal 21, and utilized for outputting a two dimension de-interlacing result 2D_pix according to a position where a target pixel to be inserted into the field. The three dimension de-interlacer 23 is coupled to the input terminal 21, and utilized for outputting a three dimension de-interlacing result 3D_pix corresponding to the target pixel. The text protection unit 24 is coupled to the input terminal 21, and utilized for determining whether the position where the target pixel to be inserted is a text area, to output a vertical interpolation operation result bob_pix corresponding to the target pixel and a text detection signal flag_text. The multiplexer 25 is coupled to the two dimension de-interlacer 22 and the text protection unit 24, and utilized for selectively outputting the two dimension de-interlacing result 2D_pix and the vertical interpolation operation result bob_pix according to the text detection signal flag_text. The motion detector 26 is coupled to the input terminal 21, and utilized for generating a motion estimation value m_value according to a motion magnitude of the image surrounding the position where the target pixel to be inserted. The blending circuit 27 is coupled to the multiplexer 25, the two dimension de-interlacer 22, the three dimension de-interlacer 23 and the motion detector 26, and utilized for blending an output of the multiplexer 25 with the three dimension de-interlacing result 3D_pix according to the motion estimation value m_value, to generate a progressive image data.

Therefore, when the motion adaptive de-interlacing device 20 receives the interlaced image data, the blending circuit 27 selectively outputs the output of the multiplexer 25, the three dimension de-interlacing result 3D_pix or a blending of the above two results according to the motion magnitude of the interlaced image, so as to generate the progressive image data.

The two dimension de-interlacer 22 performs an edge detection operation on the field of the interlaced image data according to the position where the target pixel to be inserted and performs an intra-field interpolation operation along a detected edge to output the two dimension de-interlacing result 2D_pix, whereas the three dimension de-interlacer 23 performs an inter-field interpolation operation on the field and adjacent fields of the interlaced image data to generate the three dimension interlacing result 3D_pix.

In addition, the text protection unit 24 is considered an auxiliary device of the two dimension de-interlacer 22. The text protection unit 24 interpolates the pixels in the text area through the vertical interpolation and generates the text detection signal flag_text for controlling the multiplexer 25 to output the vertical interpolation result bob_pix corresponding to the target pixel when the position where the target pixel to be inserted is determined to be the text area.

In this situation, when the motion adaptive de-interlacing device 20 receives a moving text image, such as running captions in a news channel or a scrolling cast list in a film, the embodiment of the present invention can replaces the two dimension de-interlacing result 2D_pix outputted from the two dimension de-interlacing device 22 by the vertical interpolation result bob_pix outputted from the text protection unit 24, in order to prevent image blur (or "tipped text" artifacts) on the text stroke intersection and the horizontal text stroke of the text image caused by the two dimension de-interlacer 22 falsely determining the edge direction.

Figure 3:
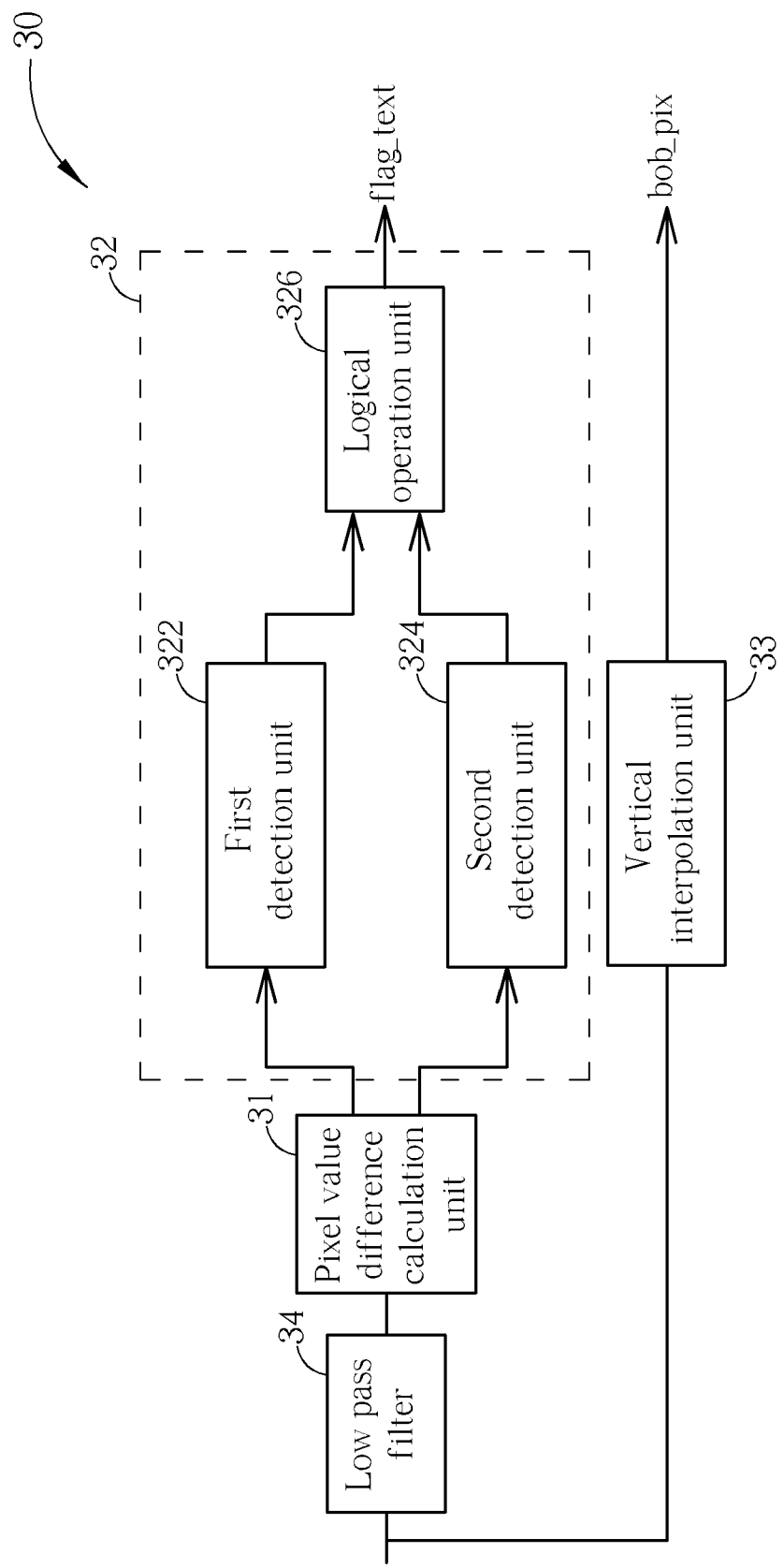
FIG. 3 is a schematic diagram of a text protection device according to an embodiment of the present invention.

Please refer to FIG. 3, which is a schematic diagram of a text protection device 30 according to an embodiment of the present invention. The text protection device 30 is utilized for implementation of the text protection device 24 shown in FIG. 2. The text protection device 30 includes a pixel value difference calculation unit 31, a text detection unit 32 and a vertical interpolation unit 33. The pixel value difference calculation unit 31 is utilized for calculating pixel value differences of a plurality of pixel pairs of a field according to a position where a target pixel to be inserted into the field. The plurality of pixel pairs forms a detection area corresponding to the target pixel. Each of the pixel pairs has two pixels corresponding to a first scan line and a second scan line. The first scan line and the second scan line are located above and below the position where the target pixel to be inserted, respectively. The text detection unit 32 is coupled to the pixel value difference calculation unit 31, and is utilized for determining whether the detection area includes a text stroke and whether the target pixel is within a range of the text stroke according to a pixel value difference distribution of the detection area to generate a text detection signal flag_text. The vertical interpolation unit 33 is utilized for performing a vertical interpolation operation on the pixels above and below the position where the target pixel to be inserted to generate a pixel value bob_pix corresponding to the target pixel.

Preferably, the text detection unit 32 further includes a first detection unit 322, a second detection unit 324 and a logical operation unit 326. The first detection unit 322 is utilized for determining a text stroke intersection occurs in the detection area when the pixel value difference distribution of the detection area has a local minimum. The second detection unit 324 is utilized for determining a horizontal text stroke occurs in the detection area when the pixel value difference distribution of the detection area has two local minimums and forms an ascend-flat-descend tendency between the two local minimums. The logical operation unit 326 is coupled to the first detection unit 322 and the second detection unit 324, and is utilized for performing a logical operation, for example "OR" operation, to generate the text detecting signal flag_text according to determining results of the first detection unit 322 and the second detection unit 324.

Figure 4:
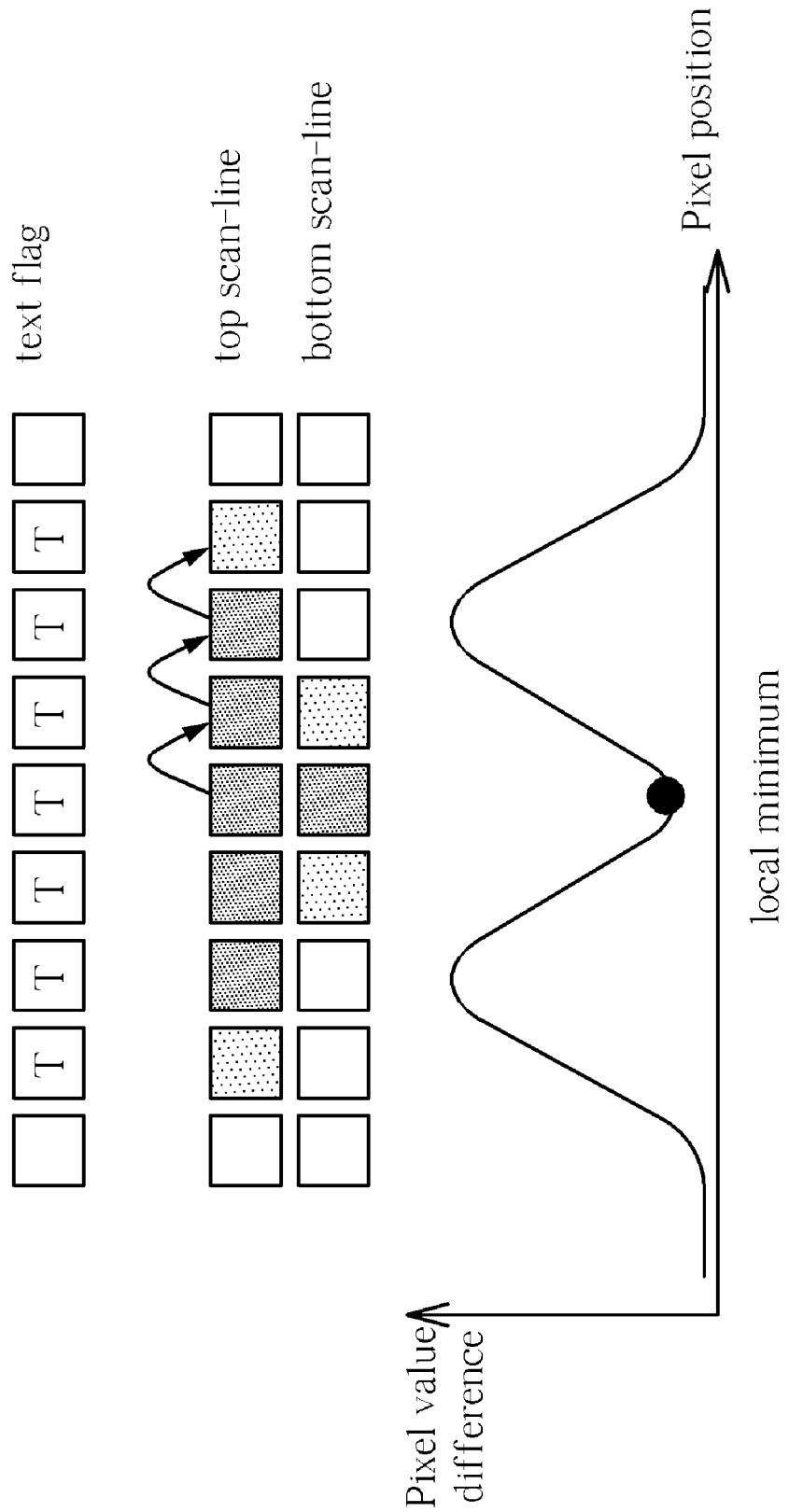
FIG. 4 illustrates a pixel value difference distribution of a detection area with a text stroke intersection according to an embodiment of the present invention.

For example, please refer to FIG. 4, which illustrates a pixel value difference distribution of a detection area 40 with a text stroke intersection according to an embodiment of the present invention. As shown in FIG. 4, on the text stroke intersection, the pixel value difference between the top pixels and the bottom pixels is small since both of the top pixels and the bottom pixels are part of the text and have a similar pixel value. At the place far from the text stroke intersection, the pixel value difference is getting great since one of the top pixels and the bottom pixels may become the background. Or both of the top pixels and the bottom pixels become the background or part of the text such that the pixel value difference maintains a smaller value. Anyway, that the top pixels or the bottom pixels will become the background eventually results in a small pixel value difference.

Therefore, when the pixel value difference distribution of the detection area has a local minimum, the embodiment of the present invention can determine a text stroke intersection exists in the detection area. In this situation, the first detection unit 322 further accumulates a pixel count of the pixels with a similar pixel value from the local minimum towards two sides of the pixel value difference distribution for marking a range of the horizontal text stroke corresponding to the text stroke intersection, as shown in FIG. 4.

Figure 5:
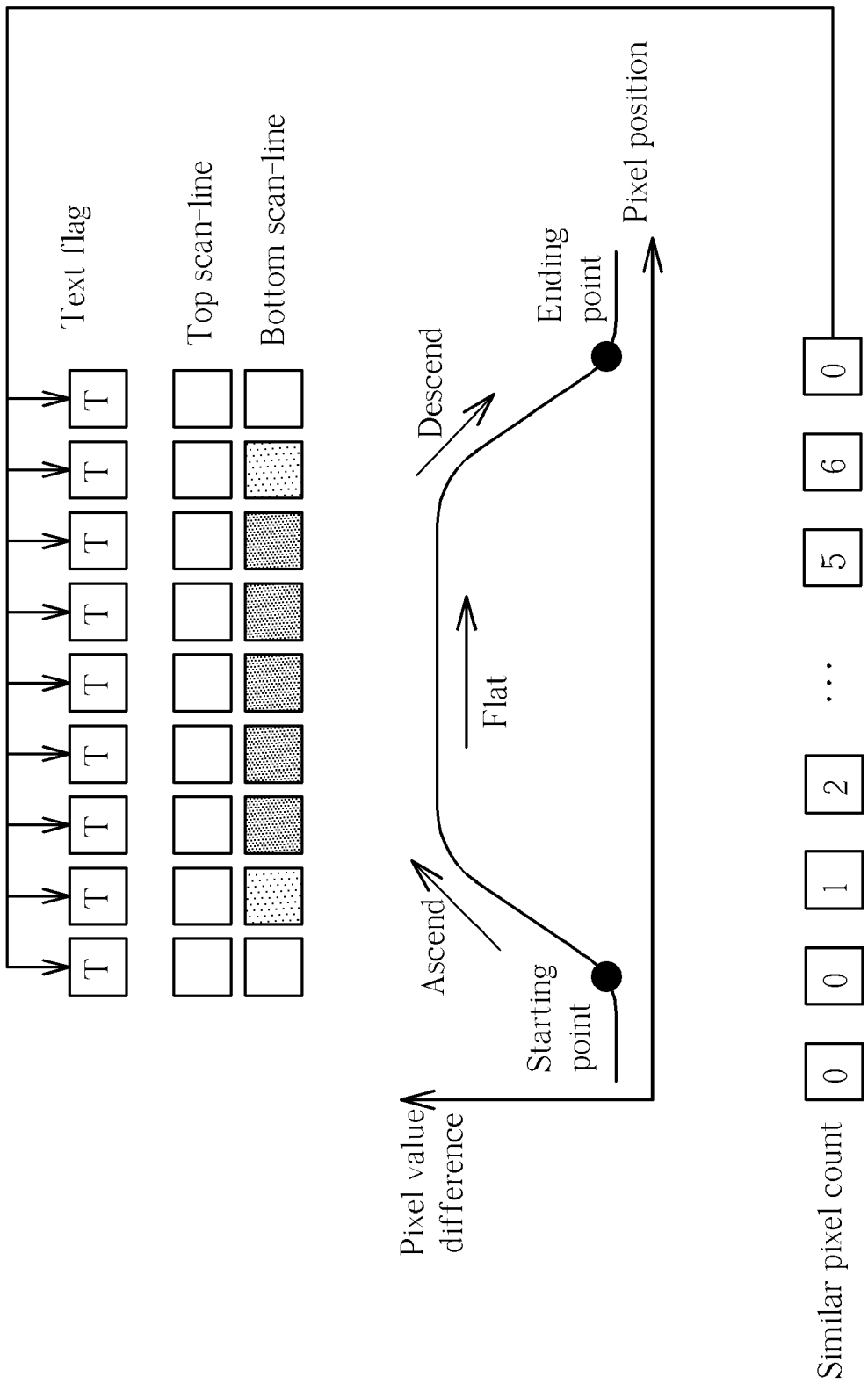
FIG. 5 illustrates a pixel value difference distribution of a detection area with a horizontal text stroke according to an embodiment of the present invention.

On the other hand, please refer to FIG. 5, which is illustrates a pixel value difference distribution of a detection area 50 with a horizontal text stroke according to an embodiment of the present invention. Since both the top pixels and the bottom pixels belong to the background at a starting point and an ending point of the horizontal text stroke, the pixel value difference between the top pixels and the bottom pixels is small. Within the range of the horizontal text stroke, the top pixels and the bottom pixels belong to the text and the background, respectively, so the pixel value difference becomes greater.

Thus, when the pixel value difference distribution of the detection area has two local minimums, and there is an ascent-flat-descent tendency between the two local minimums, the embodiment of the present invention can determine a horizontal text stroke exists in the detection area. In this situation, the second detection unit 324 can further accumulates a pixel count of the pixels with a similar pixel value from the starting point of the ascent-flat-descent tendency for marking the range of the horizontal text stroke, as shown in FIG. 5.

Consequently, the text protection device 30 generates the text detection signal flag_text according the determining results of the first detection unit 322 and the second detection unit 324 when the position of the target pixel to be inserted is determined to be the text area. The vertical interpolation unit 33 interpolates the pixels above and below the target pixel to generate the pixel value bob_pix of the target pixel. In this situation, when the position where the target pixel to be inserted is determined to be the text area, the multiplexer 25 shown in FIG. 2 can output the vertical interpolation result bob_pix corresponding to the target pixel according to the text detection signal flag_text.

On the other hand, the text protection device 30 further includes a low pass filter 34, which is utilized for performing a low pass filtering operation on the pixels in the detection area to filter out high frequency noise in the detection area or making the image smooth. However, the use of the low pass filter 34 is just one exemplary embodiment of the present invention. Those skilled in the art can make modifications according to the present invention, for example, calculating the pixel value difference in the detection area without the low pass filter. Such variations are also included in the scope of the present invention.

Please note that the said pixel value in the specification could be a luminance value, a chrominance value or any value for de-interlacing operation in practice, and is not limited herein.

Figure 6:
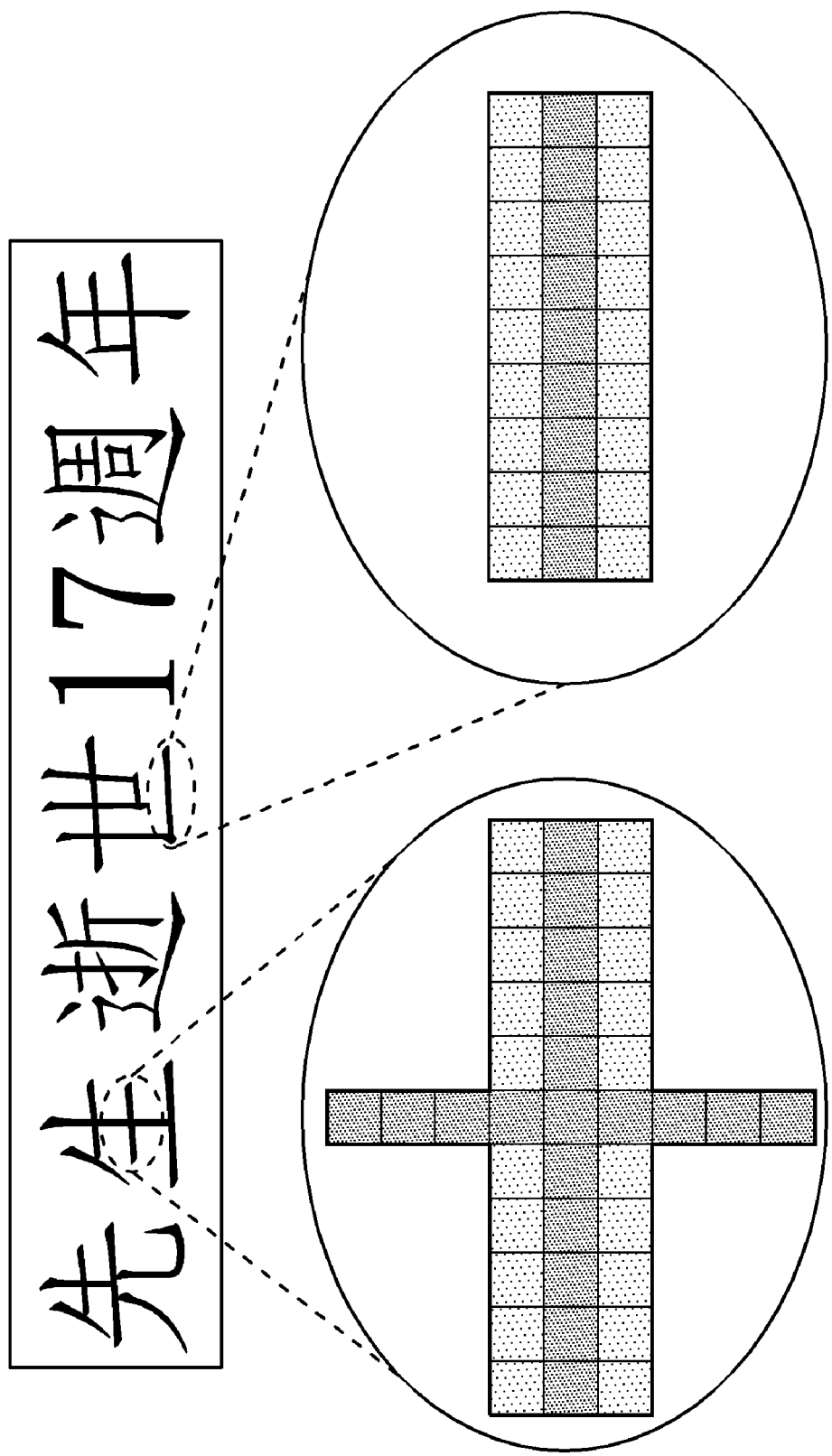
FIG. 6 illustrates an improvement of a motion text image according to an embodiment of the present invention.

As known above, when the interlaced image is received, the motion adaptive de-interlacing device not only selects a proper de-interlacing operation according to the motion magnitude of the interlaced image, but also determines whether the interlaced image includes a text area to replace the two dimensions de-interlacing result outputted from the two dimension de-interlacer by the vertical interpolation result. As a result, when the interlaced image includes the moving text image, such as running subtitles in a news channel or a scrolling cast list in a film, the embodiment of the present invention can avoid tipped text artifacts on the text stroke intersection or the horizontal text stroke of the text image caused by the false determination of the edge direction, so as to meet the user's demand for high quality image. For example, please refer to FIG. 6, which illustrates an improvement of a motion text image according to an embodiment of the present invention.

Those skilled in the art will readily observe that numerous modifications and alterations of the device and method may be made while retaining the teachings of the invention.

What is claimed is:

1. A text protection device for de-interlacing operation, the text protection device comprising:
   a pixel value difference calculation unit, for calculating pixel value differences of a plurality of pixel pairs of a field according to a position where a target pixel to be inserted into the field, the plurality of pixel pairs forming a detection area corresponding to the target pixel, each of the plurality of pixel pairs having two pixels respectively corresponding to a first scan line and a second scan line, the first scan line and the second scan line respectively located above and below the position where the target pixel to be inserted; and
   a text detection unit, coupled to the pixel value difference calculation unit, for determining whether the target pixel is within a range of a text stroke according to a pixel value difference distribution of the detection area to generate a text detection signal;
   wherein the text detection unit comprises:
      a first detection unit, for determining that a text stroke intersection occurs in the detection area when the pixel value difference distribution of the detection area has a local minimum; and
      a second detection unit, for determining that a horizontal text stroke occurs in the detection area when the pixel value difference distribution of the detection area has two local minimums and forms an ascend-flat-descend tendency between the two local minimums.

2. The text protection device of claim 1, wherein the first detection unit accumulates a pixel count of the pixels with a similar pixel value from the local minimum towards two sides of the pixel value difference distribution for marking a range of the horizontal text stroke corresponding to the text stroke intersection.

3. The text protection device of claim 1, wherein the second detection unit accumulates a pixel count of the pixels with a similar pixel value from a starting point of the ascend-flat-descend tendency for marking a range of the horizontal text stroke.

4. The text protection device of claim 1, wherein the text detection units further comprises a logical operation unit for generating the text detection signal according to determining results of the first detection unit and the second detection unit.

5. The text protection device of claim 1 further comprising:
   a low pass filter, coupled to the pixel value difference calculation unit, for performing a low pass filtering operation on pixel values of the plurality of pixel pairs to filter out high frequency noise in the detection area.

6. The text protection device of claim 1 further comprising:
   a vertical interpolation unit, for performing a vertical interpolation operation on the pixels above and below the position where the target pixel to be inserted to generate a pixel value corresponding to the target pixel.

7. The text protection device of claim 1, wherein the first scan line and the second scan line are two adjacent scan lines of the field.

8. A motion adaptive de-interlacing device with a text protection function, the motion adaptive de-interlacing device comprising:
   an input terminal, for receiving a field having interlaced image data;
   a two dimension de-interlacer coupled to the input terminal, for outputting a two dimension de-interlacing result according to a position where a target pixel to be inserted into the field;
   a three dimension de-interlacer coupled to the input terminal, for outputting a three dimension de-interlacing result corresponding to the target pixel;
   a text protection unit coupled to the input terminal, for determining whether the position where the target pixel to be inserted is a text area, to output a vertical interpolation operation result corresponding to the target pixel and a text detection signal;
   a multiplexer coupled to the two dimension de-interlacer and the text protection unit for selectively outputting the two dimension de-interlacing result and the vertical interpolation operation result according to the text detection signal;
   a motion detector coupled to the input terminal, for generating a motion estimation value according to a motion magnitude of the image surrounding the position where the target pixel to be inserted; and
   a blending circuit coupled to the multiplexer, the two dimension de-interlacer, the three dimension de-interlacer and the motion detector, for blending an output of the multiplexer with the three dimension de-interlacing result according to the motion estimation value to generate a progressive image data;
   wherein the text protection unit comprises:
      a pixel value difference calculation unit, for calculating pixel value differences of a plurality of pixel pairs in the field according to the position where the target pixel to be inserted into the field, the plurality of pixel pairs forming a detection area corresponding to the target pixel, each of the plurality of pixel pairs having two pixels respectively corresponding to a first scan line and a second scan line, the first scan line and the second scan line respectively located above and below the position where the target pixel to be inserted; and
      a text detection unit coupled to the pixel value difference calculation unit, for determining whether the target pixel is within a range of a text stroke according to a pixel value difference distribution of the detection area to generate a text detection signal;
      wherein the text detection unit comprises
         a first detection unit, for determining that a text stroke intersection occurs in the detection area when the pixel value difference distribution of the detection area has a local minimum; and
         a second detection unit, for determining that a horizontal text stroke occurs in the detection area when the pixel value difference distribution of the detection area has two local minimums and forms an ascend-flat-descend tendency between the two local minimums.

9. The motion adaptive de-interlacing device of claim 8, wherein the two dimension de-interlacer performs an edge detection operation on the field according to the position where the target pixel to be inserted and performs an intra-field interpolation operation along a detected edge to output the two dimension de-interlacing result.

10. The motion adaptive de-interlacing device of claim 8, wherein the three dimension de-interlacer performs an inter-field interpolation operation on the field and adjacent fields thereof to generate the three dimension de-interlacing result.

11. The motion adaptive de-interlacing device of claim 8, wherein the text protection unit generates the text detection signal to control the multiplexer to output the vertical interpolation result corresponding to the target pixel when the position where the target pixel to be inserted is determined to be the text area.

12. The motion adaptive de-interlacing device of claim 8, wherein the first detection unit accumulates a pixel count of the pixels with a similar pixel value from the local minimum towards two sides of the pixel value difference distribution for marking a range of the horizontal text stroke corresponding to the text stroke intersection.

13. The motion adaptive de-interlacing device of claim 8, wherein the second detection unit accumulates a pixel count of the pixels with a similar pixel value from a starting point of the ascend-flat-descend tendency for marking a range of the horizontal text stroke.

14. The motion adaptive de-interlacing device of claim 8, wherein the text detection units further comprises a logical operation unit for generating the text detection signal according to determining results of the first detection unit and the second detection unit.

15. The motion adaptive de-interlacing device of claim 8, wherein the text protection unit further comprises:
   a low pass filter coupled to the pixel value difference calculation unit, for performing a low pass filtering operation on values of the plurality of pixel pairs to filter out high frequency noise in the detection area.

16. The motion adaptive de-interlacing device of claim 8, wherein the text protection unit further comprises:
   a vertical interpolation unit, for performing a vertical interpolation operation on the pixels above and below the position where the target pixel to be inserted to generate a pixel value corresponding to the target pixel.

17. The motion adaptive de-interlacing device of claim 8, wherein the first scan line and the second scan line are two adjacent scan lines of the field.

* * * * *